Sept. 17, 1946.                C. L. NELSON                2,407,795
DEVICE FOR MAINTAINING FILM LOOPS
Filed Sept. 25, 1944
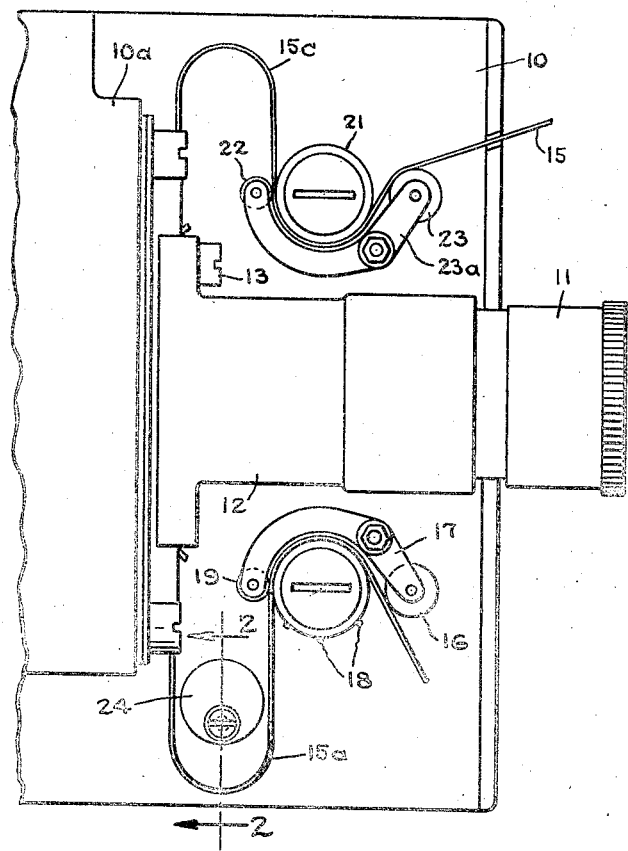
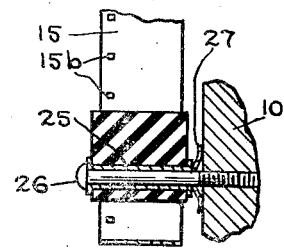
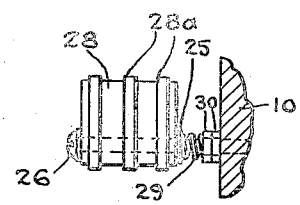
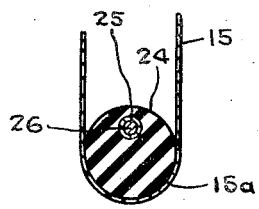
Inventor
CLARENCE L. NELSON
By Chas. C. Reif
Attorney Patented Sept. 17, 1946

2,407,795

UNITED STATES PATENT OFFICE 2,407,795

DEVICE FOR MAINTAINING FILM LOOPS

Clarence L. Nelson, Minneapolis, Minn.

Application September 25, 1944, Serial No. 555,603

7 Claims. (Cl. 88—17)

This invention relates to a projector for showing a motion picture film or to a camera or other device in which a film is progressed. As is well known in such a projector the film is moved past the light opening and lens, the film being intermittently moved a certain number of times per second. The film is moved by passing over certain toothed sprockets, the teeth of which engage in perforations in the sides of the film. There are usually one of these sprockets below the light opening and one above said opening. It is the universal practice in disposing the film to have a loop which depends below the light opening and to also have a loop which extends above the light opening. These loops are provided to give the necessary flexibility and freedom of movement to the film and if said loops should be sufficiently diminished or eliminated the film is apt to be broken. Such loops may also be used in cameras or other devices.

It is an object of this invention to provide a simple and efficient device for maintaining the said loops in the desired form or position.

It is a further object of the invention to provide a device for maintaining a film loop in a motion picture projector comprising an eccentrically mounted member disposed in the loop and movable by the film so that it will restore or form the loop if the same has become diminished.

It is more specifically an object of the invention to provide a device for maintaining a loop in a motion picture projector comprising a roller having a friction surface disposed in said loop with its axis substantially parallel to the axis of said loop, said roller being spaced from the end of said loop and eccentrically mounted with its long radius disposed away from the end of said loop, said roller being adapted to be engaged by the film, if said loop is sufficiently diminished, and rotated so that its long radius will move toward the end of the loop and restore the same.

These and other objects and advantages of the invention will be fully set forth in the following description made in connection with the accompanying drawing in which like reference characters refer to similar parts throughout the several views and in which:

Fig. 1 is a view in side elevation of a portion of a moving picture projector, said view being somewhat diagrammatic and illustrating the travel and position of the film;

Fig. 2 is a partial vertical section taken substantially on line 2—2 of Fig. 1 as indicated by the arrows;

Fig. 3 is a partial view in side elevation showing a roller used;

Fig. 4 is a partial view in vertical section illustrating said roller in another position; and Fig. 5 is a partial view in side elevation showing a modification.

Referring to the drawing a portion of a moving picture projector is shown having a frame 10 on which is mounted a barrel 11 which will carry the lens and be provided with a light opening, said barrel being secured to a head 12 secured to the portion 10a of the frame by headed bolts 13. The film is shown as 15 and will extend from a lower reel (not shown) past a roller 16 carried on a tensioning arm 17 over a sprocket 18 at one side of which is disposed another roller 19 engaging said film. Said film extends downward from sprocket 18 and a loop 15a is formed therein having substantially vertical sides and depending below sprocket 18. The film then extends vertically through a guideway past the light opening and lens in barrel 11, the light being carried in the frame portion 10a at the left of the film as shown in Fig. 1. There is usually a vertically movable arm or claw (not shown) which is reciprocated substantially parallel to the film and engages the film in the perforations therein. This arm acts to pull the film down slightly in front of the light opening and position the individual picture. The film 15 as stated, has openings 15b at one or both sides and these openings often become torn or elongated and said arm then cannot function properly. The film after passing the member 12 extends upwardly and a loop 15c is usually provided above member 12 and said film passes from loop 15c over another pulley or sprocket 21 and between the same and a roller 22. Another tensioning roller 23 carried on an arm 23a bears on the film and the film then passes to the upper reel. In the projecting operation the reel is unwound from the upper reel, moves downwardly past the light opening and is wound on the lower reel. Owing to the faulty action of the reciprocating arm referred to and for other reasons, the loops 15a and 15c and particularly 15a, tend to be taken up or to be eliminated. As above stated, if this is permitted the film is very apt to be damaged or broken. Usually the machine must be stopped to readjust the loop.

In accordance with the present invention a member illustrated as a roller 24 is provided which is disposed within loop 15a having its axis parallel to the axis of said loop. Roller 24 is illustrated as having a bushing 25 therein having flanges at the ends of said roller and being journaled on a stud 26 shown as threaded and secured in the frame 10. A spring washer 27 is disposed at one end of bushing 25 and frame 10 to exert a certain amount of friction on bushing 25 and thus on roller 24 which is secured to bushing 25. Roller 25 will be made of rubber or other material and will have a frictional surface. As shown in Fig. 3, the surface of roller 24 may be provided with knurling 24a.

In Fig. 5 a roller 28 is shown, the same having annular raised ribs 28a. These could conveniently be formed of rubber band stretched about the roller. A compression coiled spring 29 surrounds stud 26 and engages the end of bushing 25 to which roller 28 is secured. At its other end spring 29 engages the outer one of a pair of lock nuts 30. Roller 28 will also be made of rubber or other suitable material having a friction surface.

In operation, roller 24 or roller 28 will be disposed as shown in Fig. 1, some distance above the bottom or end of loop 15a. Roller 24 will be somewhat smaller in diameter than the distance between the sides of loop 15a so that normally it will not be engaged by film 15. Roller 24 is also disposed with its long radius or the greater distance between the axis of stud 26 and its periphery directed upwardly or away from the end of loop 15a. Should loop 15a now be taken up as frequently occurs, it will, when sufficiently diminished, engage the bottom of roller 24 and due to the frictional surface of said roller, the same will be rotated on stud 26. When roller 24 is rotated its long radius is moved downwardly so that it will occupy substantially the position shown in Fig. 4. When the long radius is thus moved downwardly it pulls the film downwardly and restores loop 15a to its normal position. Roller 24 will be rotated until it again reaches the position shown in Fig. 1 and it will then remain stationary due to the frictional resistance caused by spring washer 27 or spring 29. Roller 24 will remain in the position shown in Fig. 1 until loop 15a again diminishes sufficiently to engage it when the above described action will be repeated. It will be obvious that the invention will work equally well with the upper loop 15c.

From the above description it will be seen that I have invented a very simple and efficient device for restoring and maintaining the loop in a motion picture film. The device is simple in construction and can be inexpensively made and easily and quickly installed. It will act automatically to restore and maintain the loop in the desired position. The device has been amply demonstrated in actual practice and found to be very successful and efficient.

It will of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device for maintaining a film loop in a motion picture projector or other device comprising a roller disposed adjacent the end of said loop, a member on which said roller is eccentrically journalled, said roller normally being disposed with the part of its periphery farthest from said member remote from the end of said loop, said roller being adapted to be rotated by said film if said loop is sufficiently diminished to bring said part adjacent the end of said loop to restore said loop.

2. A device for maintaining a film loop in a motion picture projector or other device comprising an eccentrically mounted member disposed in said loop having its long radius remote from the end of said loop, said member being adapted to be moved by said film to bring its long radius into contact with said film.

3. A motion picture projector or the like having in combination, a frame, means for moving a film, said film having a loop therein, a member secured in said frame and extending into said loop and having its axis parallel with the axis of said loop, a roller eccentrically journaled on said member and having a friction surface, said roller normally having its long radius disposed away from the end of said loop and adapted to be rotated by said film to bring said long radius into position directed toward said end.

4. The structure set forth in claim 3 and means for exerting spring tension on said roller so that it will remain stationary when not moved by said film.

5. A motion picture projector having in combination, a frame, a portion having a light opening therethrough, means for moving a film substantially vertically past said light opening including a sprocket, said film having a loop between said sprocket and said vertical portion, a roller disposed in said loop spaced from the end thereof with its axis substantially parallel to the axis of said loop, and a member in which said roller is eccentrically journaled supported in said frame, said roller normally being disposed with its long radius directed away from said end.

6. A device for restoring a film loop in a motion picture projector comprising a roller disposed adjacent the end of said loop, said roller being eccentrically mounted and normally disposed with its long radius extending away from the end of said loop and means for retarding the rotation of said roller, said roller being adapted to be rotated by said film if said loop is sufficiently diminished to restore said loop.

7. A device for maintaining a film loop in a motion picture projector or other device comprising a member disposed in said loop and swingable about an axis, said member having one portion spaced much farther from said axis than the portion at the opposite side of said axis, said member being arranged to be out of contact with said film when said loop is of the desired size said first mentioned portion being normally disposed away from the bottom of said loop, said member being adapted to be engaged by said film and turned about said axis when said loop becomes sufficiently diminished in size so as to be swung about said axis to bring said first mentioned portion into contact with said film to restore said loop to its desired size.

CLARENCE L. NELSON.